(12) United States Patent
Bayya et al.

(10) Patent No.: US 6,405,168 B1
(45) Date of Patent: Jun. 11, 2002

(54) SPEAKER DEPENDENT SPEECH RECOGNITION TRAINING USING SIMPLIFIED HIDDEN MARKOV MODELING AND ROBUST END-POINT DETECTION

(75) Inventors: Aruna Bayya; Dianne L. Steiger, both of Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/410,215

(22) Filed: Sep. 30, 1999

(51) Int. Cl.[7] .................. G10L 15/14; G10L 15/28; G10L 15/04
(52) U.S. Cl. .................. 704/256; 704/255; 704/253
(58) Field of Search .................. 704/204, 237, 704/239, 240–242, 253, 251, 255, 256, 231

(56) References Cited

U.S. PATENT DOCUMENTS

| | | | |
|---|---|---|---|
| 5,506,933 A | * | 4/1996 | Nitta .................. 704/256 |
| 5,625,749 A | * | 4/1997 | Goldenthal et al. ......... 704/254 |
| 6,195,634 B1 | * | 2/2001 | Dudemaine et al. ........ 704/251 |
| 6,223,155 B1 | * | 4/2001 | Bayya .................. 704/256 |

\* cited by examiner

Primary Examiner—William Korzuch
Assistant Examiner—Daniel A. Nolan
(74) Attorney, Agent, or Firm—Akin, Gump, Strauss, Hauer & Feld, L.L.P.

(57) ABSTRACT

A speech recognition training system that provides for model generation to be used within speaker dependent speech recognition systems requiring very limited training data, including single token training. The present invention provides a very fast and reliable training method based on the segmentation of a speech signal for subsequent estimating of speaker dependent word models. In addition, the invention provides for a robust method of performing end-point detection of a word contained within a speech utterance or speech signal. The invention is geared ideally for speaker dependent speech recognition systems that employ word-based speaker dependent models. The invention provides the end-point detection method is operable to extract a desired word or phrase from a speech signal that is recorded in varying degrees of undesirable background noise. In addition, the invention provides a simplified method of building the speaker dependent models using a simplified hidden Markov modeling method. The invention requires very limited training and is operable within systems having constrained budgets of memory and processing resources. Some examples of candidate application areas include cellular telephones and other devices that would benefit from abbreviated training and have inherently limited memory and processing power.

20 Claims, 9 Drawing Sheets

Speaker Dependent
Speech Recognition System

End-point Detection within
Speech Recognition System

Training of Speaker Dependent Speech Recognition System

SPEAKER DEPENDENT SPEECH RECOGNITION TRAINING USING SIMPLIFIED HIDDEN MARKOV MODELING AND ROBUST END-POINT DETECTION

BACKGROUND

1. Technical Field

The present invention relates generally to speech recognition; and, more particularly, it relates to the generation of speaker dependent hidden Markov models for speech recognition training within systems that employ speech recognition.

2. Related Art

Conventional speech recognition systems commonly employ complex training methods. While these complex training methods do in fact provide good model parameter estimation, in the instance where little training data is available, the quality of the model parameter estimation is significantly compromised. In addition, these conventional speech recognition systems that employ these complex training methods inherently require a significant amount of training data. However, it is not practical to collect a significant amount of speech for speaker dependent training systems. Conventional speech recognition systems simply do not perform well with limited training and limited training data. Moreover, these conventional speech recognition systems require a significant amount of memory and processing resources to perform the complex training methods. Such a memory and computationally intensive solution for training a speech recognition system is not amenable to embedded systems. While these conventional speech recognition systems that employ complex training methods are quite amenable where there is a large availability of such memory and processing resources, they are not transferable to systems where memory and processing resources are constrained and limited, i.e., embedded systems.

Certain conventional systems also employ hidden Markov modeling (HMM) for training of the speaker dependent speech recognition system. For example, within conventional systems that seek to represent a large number of states, those speech recognition systems inherently require the significant amount of processing during training of the speaker dependent speech recognition system, thereby requiring a significant amount of memory and processing resources. The conventional methods of training speaker dependent speech recognition systems simply do not provide an adequate method of performing simplified training when the memory and processing resources of the speech recognition system are constrained.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a speech processing system that determines an end-point and a beginning point of a word within a speech utterance. The speech processing system contains, among other things, an element selection circuitry, a speech segmentation circuitry, and a state determination circuitry. The element selection circuitry selects a subset of elements from a feature vector using various criteria. These various criteria are used to perform the selection of certain elements within the feature vector. The various criteria include, among other things, clustering and correlation between multiple elements of the speech utterance. The speech segmentation circuitry uses the selected number of elements from the feature vector to determine the boundaries of the segments of the speech utterance. Subsequently, after the segments of the speech utterance are chosen, the features vector for each frame in the speech segment are used to estimate the model parameters of the speech utterance. For embodiments of the invention that employ uniform segmentation, no subset of elements from the feature vector need to be selected, as the speech utterance is segmented into a number of segments having equal width irrespective of the feature vector.

A training token is a speech utterance used to perform training of the speech recognition system. For single token training, the training method is very simple and easily trainable. The model parameters are estimated from a single training token in this case. For training that employs multiple training tokens, the same segmentation process is performed to segment each training token, and the model parameters are estimated using the segments of all the multiple training tokens. In another implementation, the first training token is segmented either uniformly or non-uniformly, as described above, and the model parameters are estimated based on the segmentation. The other embodiments employing training tokens, in multiple training token systems, are segmented using the previously estimated model parameters, and a single iteration of Viterbi alignment. The new segments are used to update the previously estimated model parameters.

The state determination circuitry determines a number of states to be modeled from the speech utterance. The number of states of the speech utterance corresponds exactly to the number of segments into which the speech utterance is segmented. The number of states of the speech utterance is determined by the number of frames in the end-pointed speech utterance. The segmentation of the speech utterance is uniform in certain embodiments of the invention, and non-uniform in other embodiments of the invention. If desired, the speech processing system is operable within either of a speech recognition training system of a speech recognition system.

Other aspects of the invention can be found in a speech recognition training system that generates a model used to perform speech recognition on a speech signal. The speech recognition training system contains, among other things, a model generation circuitry, a speech segmentation circuitry, and a state determination circuitry. As described above, the feature vector is generated from the speech signal. The speech segmentation circuitry uses a number of elements from the feature vector to perform segmentation of the speech signal. The state determination circuitry determines a number of states of the speech signal. The number of states of the speech utterance corresponds exactly to the number of segments into which the speech utterance is segmented. The number of states of the speech utterance is determined by the number of frames in the end-pointed speech utterance. Moreover, in certain embodiments of the invention, a single iteration of Viterbi alignment is performed to determine the segmentation of the speech signal. In various embodiments, the segmentation of the speech signal is uniform; in others, the segmentation of the speech signal is non-uniform. Moreover, the speech recognition training system performs end-point detection of a speech utterance of the speech signal.

Even other aspects of the invention can be found in a method that generates a model used to perform speech recognition on a speech signal. The method involves, among other steps, the selection of a number of elements from a feature vector, the segmentation of the speech signal using the number of elements from the feature vector, and the determination of a number of states of the speech signal. As described above, in various embodiments of the invention, the segmentation of the speech signal is uniform; in others, it is non-uniform.

Other aspects, advantages and novel features of the present invention will become apparent from the following detailed description of the invention when considered in conjunction with the accompanying drawings.

DETAILED DESCRIPTION OF THE INVENTION

Figure 1:
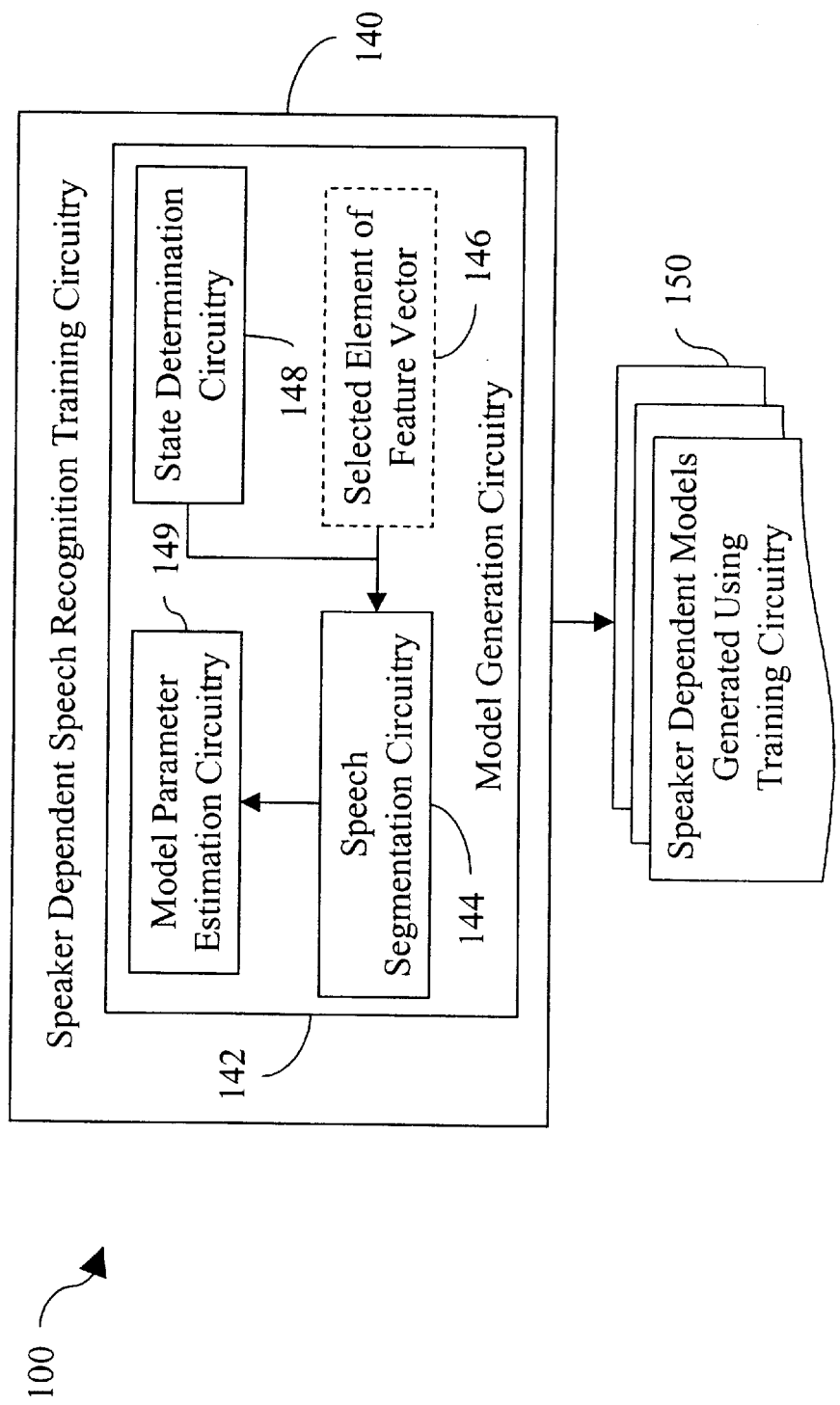
FIG. 1 is a system diagram illustrating one embodiment of a speaker dependent speech recognition training system built in accordance with the invention.

FIG. 1 is a system diagram illustrating one embodiment of a speaker dependent speech recognition training system 100 built in accordance with the invention. The speaker dependent speech recognition training system 100 contains a speaker dependent speech recognition training circuitry 140 that generates a plurality of speaker dependent models 150. The speaker dependent speech recognition training circuitry 140 itself contains a model generation circuitry 142. The model generation circuitry 142 incorporates a speech segmentation circuitry 144, a state determination circuitry 148, and a model parameter estimation circuitry 149. In embodiments of the invention that perform non-uniform segmentation, a selected number of elements of a feature vector 146 is used to control the segmentation of the speech signal that is performed using the speech segmentation circuitry 144. In embodiments of the invention that perform uniform segmentation, the boundaries of the segments are determined solely by the number of states using state determination circuitry 148. The feature vector is a vector of elements that is used to characterize the speech signal.

The state determination circuitry 148 controls the specific element to be used as the selected number of elements of the feature vector 146. For example, in certain embodiments of the invention, a particular subset of elements of the feature vector is used to by the speech segmentation circuitry 144 to perform the speech signal's segmentation. The plurality of speaker dependent models 150 that are generated using the speech recognition training circuitry 140 are subsequently used to perform speaker dependent speech recognition. It should be noted, however, that after the segmentation of the speech signal is performed using the speech segmentation circuitry 144, and although a selected number of elements of the feature vector 146 is used to control the segmentation of the speech signal, the model parameters of the speech signal are generated using the entire feature vector.

Many different processes are performed in accordance with the invention, without departing from the scope and spirit thereof, to generate the feature vector of the speech signal. For example, such feature vector extraction methods including linear prediction coding (LPC), perceptual linear prediction (PLP), and Melmerstein (MEL) are used to generate a concise set of elements to characterize the speech signal in certain embodiments of the invention. Additional feature vector extraction methods are performed in other embodiments of the invention to characterize the speech signal.

The speech segmentation circuitry 144 uses the selected number of elements of the feature vector 146 to choose how and where to segment the speech signal. In certain embodiments of the invention, the speech segmentation circuitry 144 uses the selected number of elements of the feature vector 146 in conjunction with the state determination circuitry 148 to determine the placement of the individual segments of the segmented speech signal. If desired, a predetermined number of steps of Viterbi alignment on the speech signal is used to determine the placement of the segments within the speech signal. In one embodiment of the invention, a single step of Viterbi alignment is performed to choose where to segment the speech signal. In other embodiments of the invention, multiple iterations of Viterbi alignment are performed to choose where to segment the speech signal.

Figure 2:
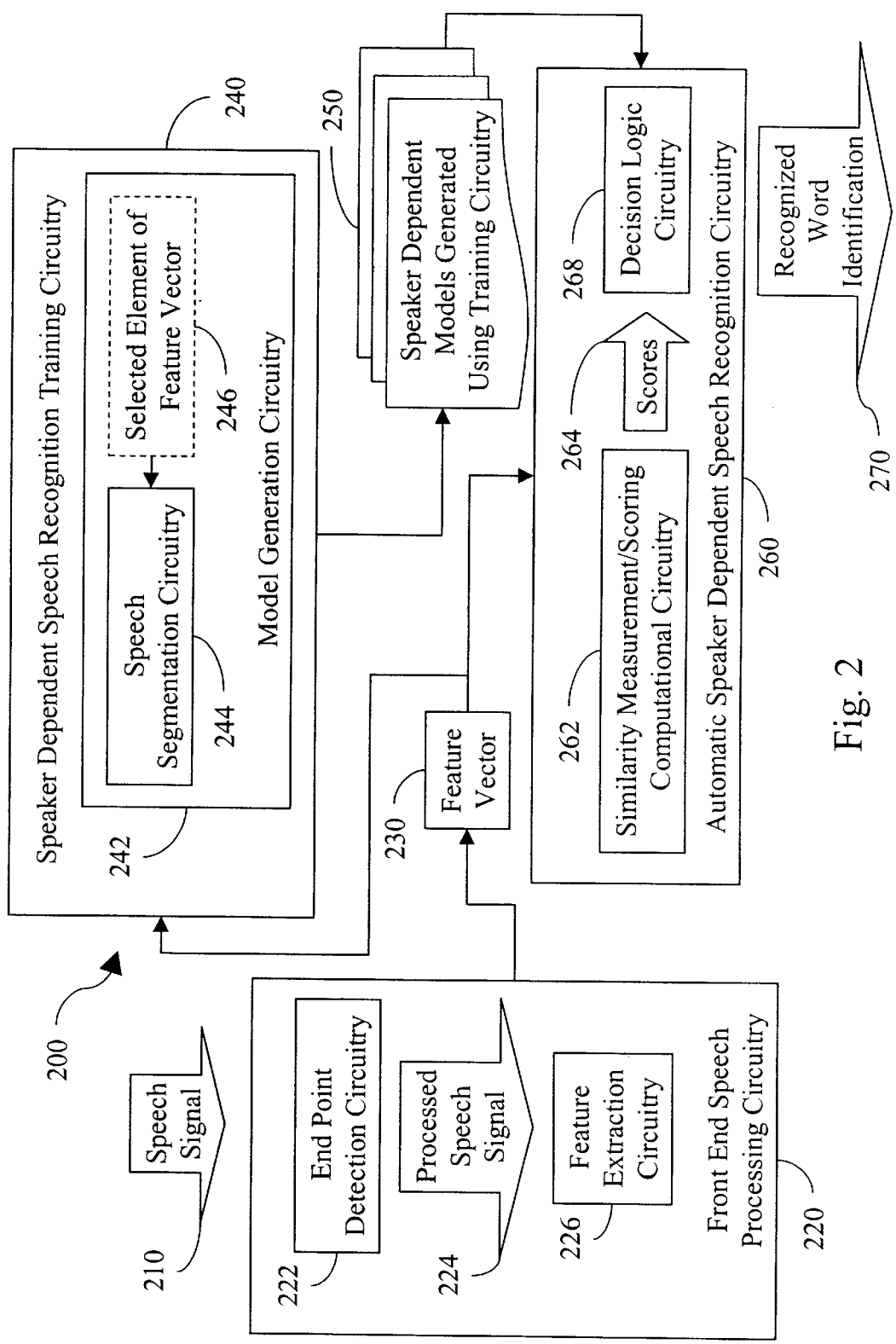
FIG. 2 is a system diagram illustrating one embodiment of an integrated speaker dependent speech training and speaker dependent recognition system built in accordance with the invention.

FIG. 2 is a system diagram illustrating one embodiment of an integrated speaker dependent speech training and speaker dependent recognition system 200 built in accordance with the invention. The integrated speaker dependent speech training and speaker dependent recognition system 200 performs processing on a speech signal 210 using a front-end speech processing circuitry 220 to generate a feature vector 230. The feature vector 230 is then used, during training of the integrated speaker dependent speech training and speaker dependent recognition system 200, by a speaker dependent speech recognition training circuitry 240. The speaker dependent speech recognition training circuitry 240 generates a plurality of speaker dependent models 250. During the performance of speaker dependent speech recognition, the integrated speaker dependent speech training and speaker dependent recognition system 200 uses an automatic speaker dependent speech recognition circuitry 260, that itself uses the feature vector 230 and the plurality of speaker dependent models 250 generated using the speaker dependent speech recognition training circuitry 240, to perform a recognized word identification 270.

The speech signal 210 is fed into the front-end speech processing circuitry 220 of the integrated speaker dependent speech training and speaker dependent recognition system 200, irrespective of whether the integrated speaker dependent speech training and speaker dependent recognition system 200 is performing speaker dependent speech recognition or speaker dependent speech recognition training. The front-end speech processing circuitry 220 contains, among other things, an end point detection circuitry 222 and a feature vector extraction circuitry 226. The feature vector extraction circuitry 226 employs any method known in the art of speech for extracting the feature vector.

A processed speech signal 224 is generated from the speech signal 210, after having passed through the end point detection circuitry 222. The feature vector extraction circuitry 226 is used to generate the feature vector 230. As described above in other embodiments of the invention, linear prediction coding (LPC) is used by the feature extraction circuitry 226 to generate various elements constituting the feature vector 230. Additional feature vector extraction methods are employed by the feature extraction circuitry 226 in other embodiments of the invention.

During speech recognition training, the feature vector 230 is provided to the speaker dependent speech recognition training circuitry 240. The speaker dependent speech recognition training circuitry 240 itself contains, among other things, a model generation circuitry 242. In certain embodiments of the invention, the model generation circuitry 242 performs estimation of the model parameters. The plurality of speaker dependent models 250 that are generated using the speaker dependent speech recognition training circuitry 240 are generated largely from the processing performed on the feature vector 230 by estimation performed by the model generation circuitry 242. The model generation circuitry 242 itself contains, among other things, a speech segmentation circuitry 244 that uses a selected number of elements of the feature vector 246 to perform its speech segmentation. The selected number of elements of the feature vector 246 is any number of elements contained within the feature vector 230 that itself corresponds to the speech signal 210.

Any number of elements contained within the feature vector 230 that correspond to some component of the speech signal 210, either directly or indirectly, is employed without departing from the scope and spirit of the invention. The selected number of elements of the feature vector 246 are selected using various criteria including clustering, correlation matrix, distributions (histograms). Different criteria result in a different set of elements that are selected as the selected number of elements of the feature vector 246.

The plurality of speaker dependent models 250 that are generated using the speaker dependent speech recognition training circuitry 240 are used by the automatic speaker dependent speech recognition circuitry 260 to perform real time speech recognition. Also, as described above, when the integrated speaker dependent speech training and speaker dependent recognition system 200 performs speech recognition, the speech signal 210 is processed using the front-end speech processing circuitry 220, and the feature vector 230 is generated and fed to the automatic speaker dependent speech recognition circuitry 260. The automatic speaker dependent speech recognition circuitry 260 itself contains, among other things, a similarity measurement/ scoring computational circuitry 262 and a decision logic circuitry 268. The similarity measurement/scoring computational circuitry 262 generates a plurality of scores 264 for the feature vector 230 that corresponds to the speech signal 210 using the plurality of speaker dependent models 250 that are generated using the speaker dependent speech recognition training circuitry 240. Depending on the plurality of scores 264 that are generated by the similarity measurement/ scoring computational circuitry 262, the decision logic circuitry 268 determines whether the speech signal 210 is to be identified with an utterance that was previously entered into the integrated speaker dependent speech training and speaker dependent recognition system 200 during speech recognition training. If the speech signal 210 is in fact identified as a match by the decision logic circuitry 268, then the recognized word identification 270 is provided by the automatic speaker dependent speech recognition circuitry 260 of the integrated speaker dependent speech training and speaker dependent recognition system 200.

Figure 3:
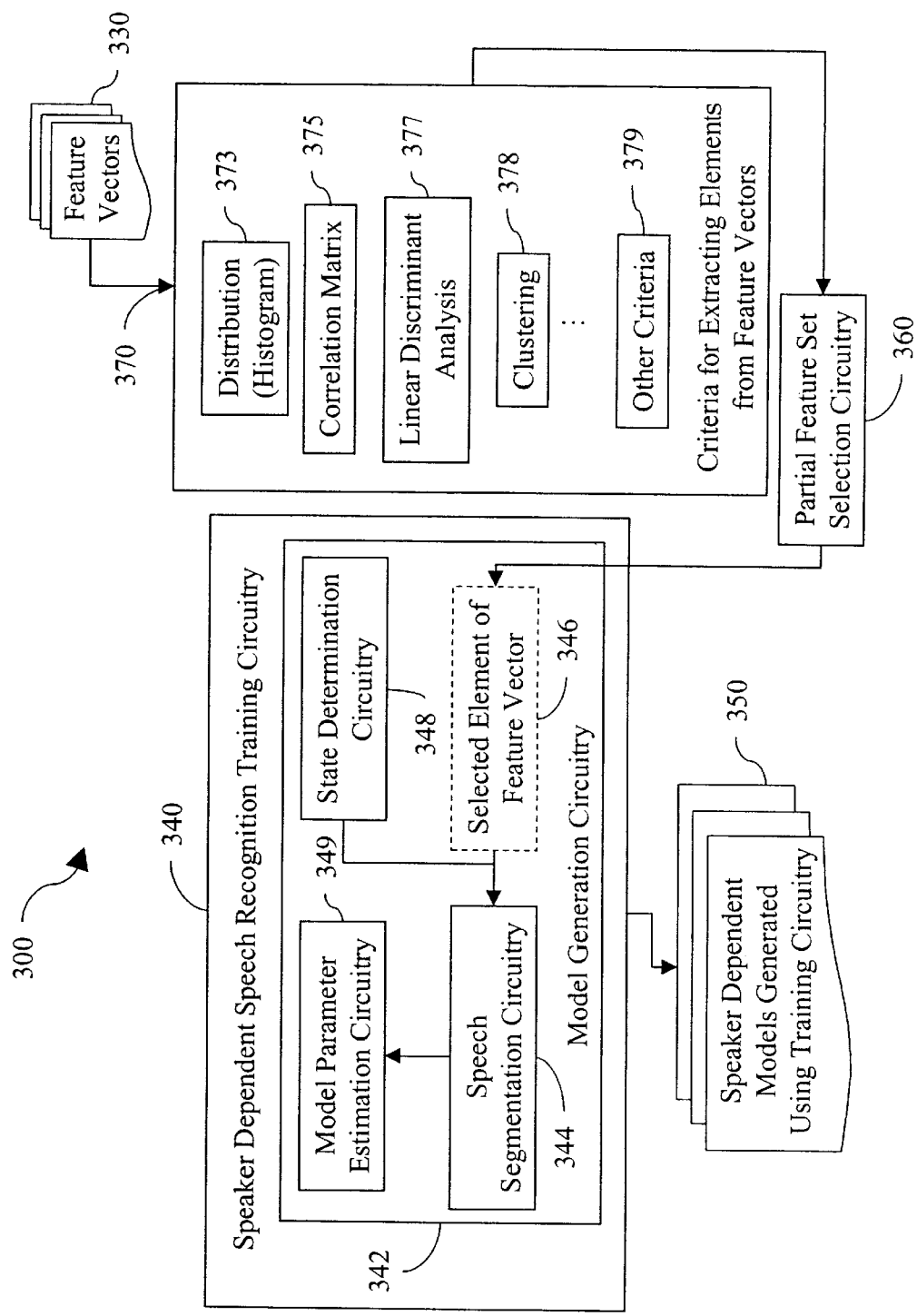
FIG. 3 is a system diagram illustrating another embodiment of a speaker dependent speech recognition training system built in accordance with the invention performs element selection from among a plurality of feature vectors.

FIG. 3 is a system diagram illustrating another embodiment of a speaker dependent speech recognition training system 300 built in accordance with the invention performs element selection from among a plurality of feature vectors 330 using various criteria 370. The speech recognition training system itself contains, among other things, a speaker dependent speaker dependent speech recognition training circuitry 340 and a partial feature set selection circuitry 360. The partial feature set selection circuitry 360 selects a selected number of elements of the feature vector 346 using one of the various criteria 370. A plurality of speaker dependent models 350 is generated using the speaker dependent speech recognition training circuitry 340. The plurality of speaker dependent models 350 is used to perform speaker dependent speech recognition in any of the embodiments of the invention described in the various Figures that perform speaker dependent speech recognition.

The speaker dependent speech recognition training circuitry 340 itself contains, among other things, a model generation circuitry 342. The model generation circuitry 342 itself contains, among other things, a speech segmentation circuitry 344, a state determination circuitry 348, and a model parameter estimation circuitry 349. The state determination circuitry 348 uses the selected number of elements of the feature vector 346 to perform intelligent speech segmentation of a speech signal. In one embodiments of the invention, clustering of frames of the speech signal is used to determine the segment boundaries. The selected number of elements of the feature vector 346 is provided to the speech segmentation circuitry 344 by the partial feature set selection circuitry 360.

For example, in certain embodiments of the invention, the various criteria 370 include a distribution (histogram) function 373, a correlation matrix function 375, a linear discriminant analysis function 377, a clustering function 378, and any other criteria function 379. Any number of the various criteria 370 used from which the statistically independent elements are generated.

In embodiments of the invention that perform uniform segmentation, the plurality of feature vectors 330 are input directly into the model generation circuitry 342. The segmentation boundaries are determined solely by the number of states.

Figure 4:
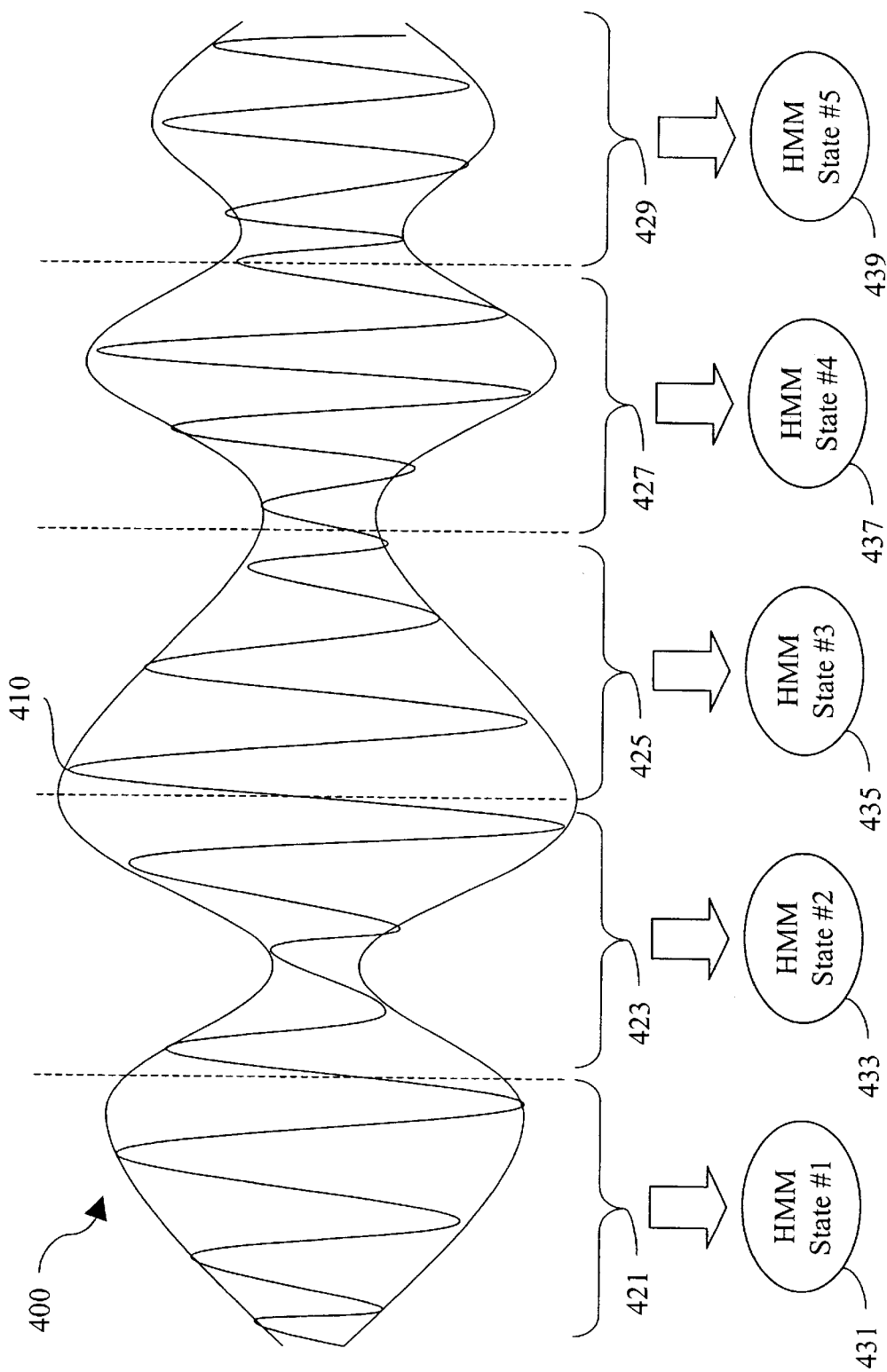
FIG. 4 is a speech signal diagram illustrating an embodiment of the invention that partitions a speech signal into a predetermined number of uniform segments.

FIG. 4 is a speech signal diagram 400 illustrating an embodiment of the invention that partitions a speech signal 410 into a predetermined number of segments. The speech signal 410 is partitioned into a first uniform speech signal segment 421, a second uniform speech signal segment 423, a third uniform speech signal segment 425, a fourth uniform speech signal segment 427, and a fifth uniform speech signal segment 429. Each of the uniform speech signal segments 421–429 correspond to a hidden Markov model (HMM) state. Hidden Markov models (HMMs) are well known to those having skill in the art of speech signal processing, including speech recognition and speech recognition training. However, traditional implementations of hidden Markov models (HMMs) typically require a number of iterations and computationally intensive processing to perform model parameter estimation that converges. That is to say, traditional implementation of hidden Markov models (HMMs) is shown to characterize the speech signal very well in the feature spaces that best represent the acoustic properties of a speech signal as audibly perceptible by the human ear. However, ultimate convergence of a hidden Markov modeling on a speech signal is very consumptive in terms of memory and computational resources; this is largely due to the complexity of the hidden Markov model and the training process. The present invention is operable using hidden Markov modeling in a degree or number of iterations wherein the hidden Markov modeling does not require convergence; this preliminary hidden Markov modeling is used, at least in part, to determine where the speech signal 410 is to be segmented before model parameter estimation of the speech signal 410. For example, a predetermined number of iterations of hidden Markov modeling are performed within the present invention.

A hidden Markov model (HMM) state #1 431 is generated that corresponds to the first uniform speech signal segment 421; a hidden Markov model (HMM) state #2 433 is generated that corresponds to the second uniform speech signal segment 423; a hidden Markov model (HMM) state #3 435 is generated that corresponds to the third uniform speech signal segment 425; a hidden Markov model (HMM) state #4 437 is generated that corresponds to the fourth uniform speech signal segment 427; a hidden Markov model (HMM) state #5 439 is generated that corresponds to the fifth uniform speech signal segment 429. This particular embodiment of the invention is exemplary of an embodiment wherein the speech signal partitioned into a predetermined number of speech signal segments having uniform width. Other embodiments, including that which is shown below in FIG. 5, partition the speech signal into a predetermined number of speech signal segments having non-uniform width.

Figure 5:
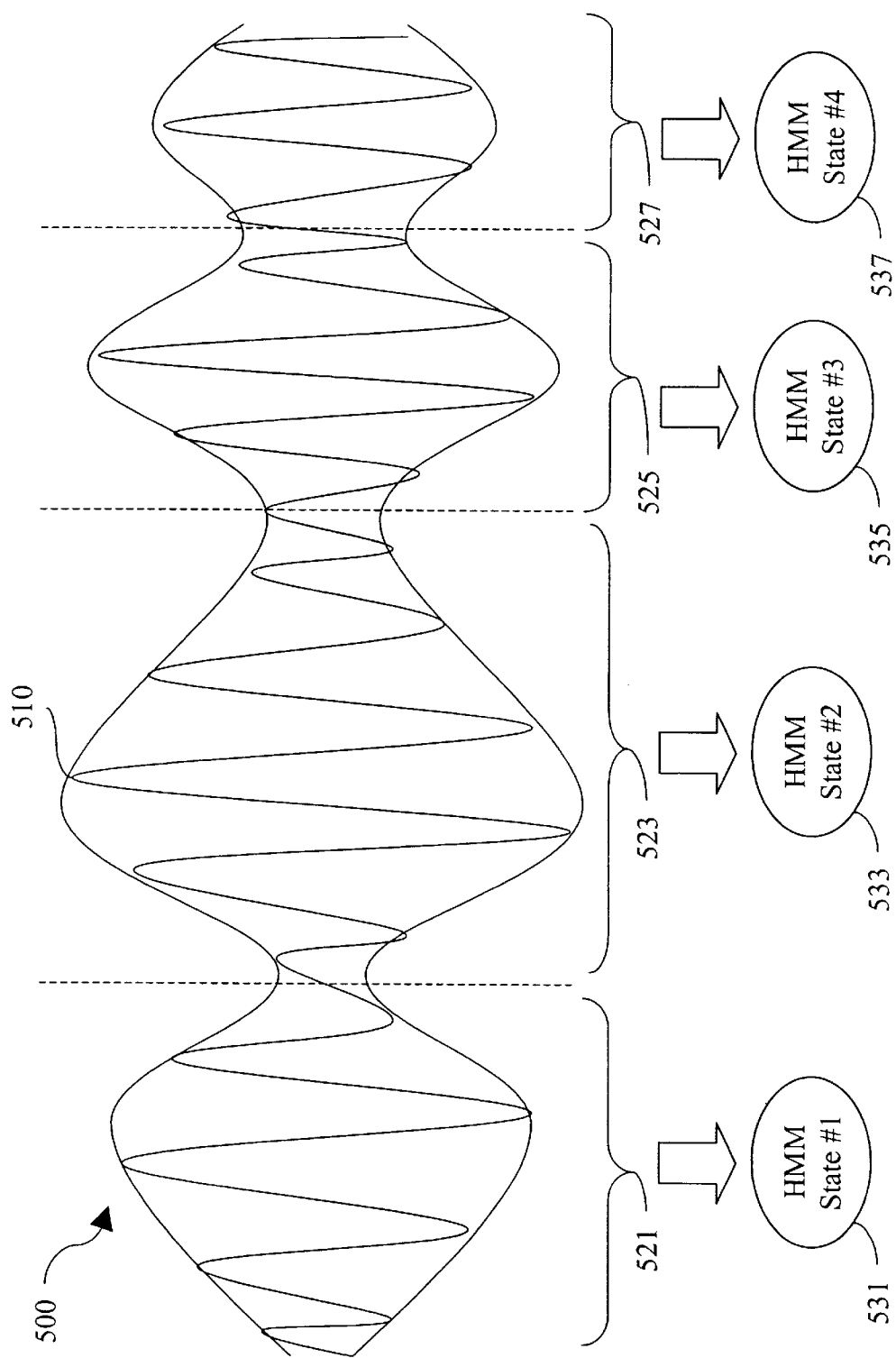
FIG. 5 is a speech signal diagram illustrating an embodiment of the invention that partitions a speech signal into a predetermined number of non-uniform segments.

FIG. 5 is a speech signal diagram 500 illustrating an embodiment of the invention that partitions a speech signal 510 into a predetermined number of non-uniform segments. The speech signal 510 is partitioned into a first non-uniform speech signal segment 521, a second non-uniform speech signal segment 523, a third non-uniform speech signal segment 525, and a fourth non-uniform speech signal segment 527. Each of the non-uniform speech signal segments 521–527 correspond to a hidden Markov model (HMM) state.

Various embodiments of the invention described in the various Figures use a selected number of elements of a feature vector of the speech signal 510 to perform the non-uniform segmentation. For example, in certain embodiments of the invention, the selected number of elements of the feature vector 346 (as shown in FIG. 3) is used in a clustering of frames, each in turn determining the boundaries of the non-uniform segmentation of the speech signal 510. After the speech signal 510 has been segmented non-uniformly, the model parameters are then estimated from the frames in the segments of the speech signal 510.

For example, a hidden Markov model (HMM) state #1 531 is generated that corresponds to the first non-uniform speech signal segment 521; a hidden Markov model (HMM) state #2 533 is generated that corresponds to the second non-uniform speech signal segment 523; a hidden Markov model (HMM) state #3 535 is generated that corresponds to the third non-uniform speech signal segment 523; a hidden Markov model (HMM) state #4 537 is generated that corresponds to the fourth non-uniform speech signal segment 527. This particular embodiment of the invention is exemplary of an embodiment wherein the speech signal partitioned into a predetermined number of speech signal segments having non-uniform width. Other embodiments, including that which is shown above in FIG. 4, partition the speech signal into a predetermined number of speech signal segments having uniform width. Any additional tokens are segmented using only a single iteration of Viterbi alignment.

Figure 6:
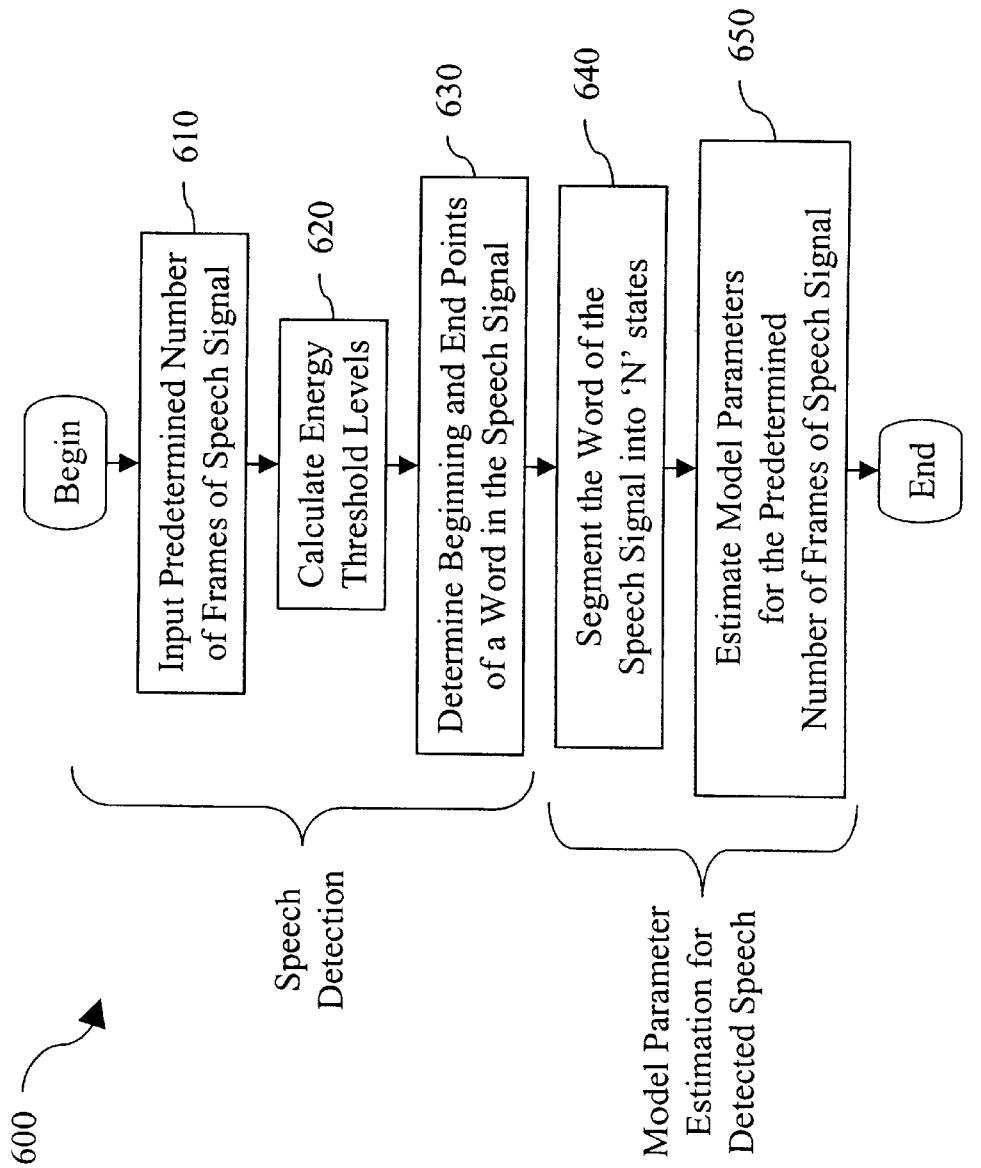
FIG. 6 is a functional block diagram illustrating a method performed in accordance with the invention that performs speech detection and model parameter estimation.

FIG. 6 is a functional block diagram illustrating a method 600 performed in accordance with the invention that performs speech detection and model parameter estimation. In a block 610, a predetermined number of frames of a speech signal are input into a speech processor. If desired, the predetermined number of frames of the speech signal, as shown in the block 610, is at least five frames of the speech signal. Subsequently, in a block 620, at least two threshold energy levels are calculated for the speech signal using the predetermined number of frames. Again, the invention is operable to calculate at least two threshold energy levels using at least five frames of the speech signal in the block 620. The beginning and ending points of the speech signal are determined in a block 630 using the at least two threshold energy levels that are calculated in the block 620. In a block 640, the speech signal that is identified using the beginning and ending points of the speech utterance as performed in the block 630, is uniformly or non-uniformly segmented into a predetermined number of states; namely, the word of the speech signal is partitioned into 'N' states. In certain embodiments of the invention, the predetermined number of states into which the speech signal is partitioned in the block 640 correspond to a predetermined number of hidden Markov model (HMM) states, as described in the various embodiments of the invention in the Figures above, and namely in FIGS. 4 and 5. Finally, in a block 650, a plurality of model parameters corresponding to the speech signal are estimated.

Figure 7:
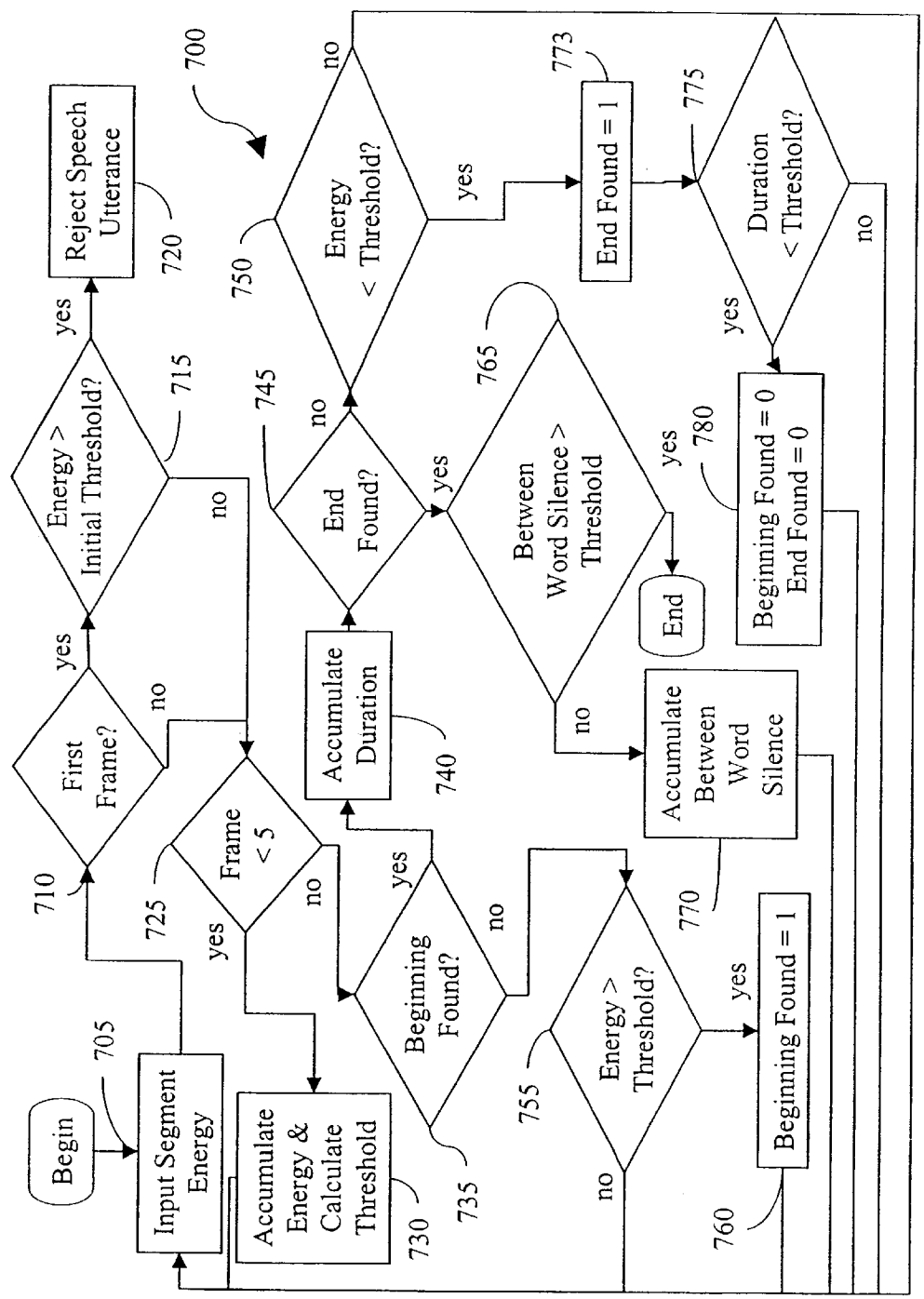
FIG. 7 is a functional block diagram illustrating a method performed in accordance with the invention that performs end point detection within a speech signal and performs speaker dependent speech recognition in accordance with the invention.

FIG. 7 is a functional block diagram illustrating a method 700 performed in accordance with the invention that performs end point detection within a speech signal and performs speech recognition in accordance with the invention. In a block 705, an energy of a speech frame is input into a speech processor that performs the method 700. Subsequently, using the energy of the speech frame of the decision block 710, it is determined if the energy of the speech frame within the block 705 corresponds to a first frame of the speech signal. If it is found that a first frame of the speech signal is in fact found in the decision block 710, then it is further determined in a decision block 715 if the energy of the speech frame exceeds a predetermined initial energy threshold. The predetermined initial energy threshold is stored in a memory location of the speech processor that performs the method 700. If the energy of the speech frame does in fact exceed the predetermined initial energy threshold, then the speech signal utterance, from which the speech frame is extracted, is rejected. Here, the speech recognition of the method 700 determines that the user started speaking before the recording starts.

However, if it is determined that the current frame is not the first frame in the decision block 710, then it is further determined if the speech signal frame is one of a first predetermined number of speech signal frames. In the embodiment shown in the method 700, in a decision block 725, it is specifically determined if the speech signal frame is one the first five speech signal frames. If the speech signal frame is in fact one of the first five speech signal frames, as determined in the decision block 725, then the energy of the speech signal in that frame is accumulated and the threshold is calculated in a block 730 with other speech signal frames. Similarly, if the energy of the speech frame does not exceed the predetermined initial energy threshold, as determined in the decision block 715, then it is also further determined if the speech signal frame is one a first predetermined number of speech signal frames. In the decision block 725, it is specifically determined if the speech signal frame is one the first five speech signal frames. If the speech signal frame is in fact one of the first five speech signal frames, as determined in the decision block 725, then the energy of the speech signal of the speech frame is accumulated in a block 730 with other speech frames. The method 700 then returns to the block 705 to input an energy from a subsequent speech frame, and the method 700 continues using the subsequent speech frame.

However, if it is determined in the decision block 725 that the speech frame is not within the first five speech signal frames, then it is determined in a decision block 735 if a beginning of a word within the speech signal is found. If a beginning of a word within the speech signal is not found in the decision block 735, then it is further determined in a decision block 755 if the energy of the speech frame exceeds an energy threshold. The energy threshold in the decision block 755 is differentiated from the predetermined initial energy threshold in the decision block 715 in certain embodiments of the invention. In other embodiments of the invention, the energy threshold in the decision block 755 and the predetermined initial energy threshold in the decision block 715 are the same energy threshold. If desired, the energy threshold in the decision block 755 is modified in real time as a function of the energy of the speech signal itself. If it is determined in the decision block 755 that the energy of the speech signal does not exceed the energy threshold in the decision block 755, then the method 700 then returns to the block 705 to input an energy from a subsequent speech frame, and the method 700 continues using the subsequent speech frame. Alternatively, if it is determined in the decision block 755 that the energy of the speech signal does in fact exceed the energy threshold in the decision block 755, then a beginning of the speech signal is deemed to have been found, and a variable "beginning found" is set to a value of "1" in a decision block 760 in the embodiment shown within the method 700 of the FIG. 7. Subsequently, the method 700 then returns to the block 705 to input an energy from a subsequent speech frame, and the method 700 continues using the subsequent speech frame.

Alternatively, if a beginning of a word within the speech signal is in fact found in the decision block 735, then the duration of the speech frame is accumulated in a block 740. Subsequently, in a decision block 745, it is determined if an end of the speech signal has been found. If it is determined in the decision block 745 that an end of the speech signal has in fact been found, then in a decision block 765, it is further determined if a between word silence exceeds a predetermined threshold. If the between word silence does in fact exceed the predetermined threshold in the decision block 765, then the method 700 terminates. However, if the between word silence does not exceed the predetermined threshold in the decision block 765, then the between word silence is accumulated in the block 770. Subsequently, the method 700 then returns to the block 705 to input an energy from a subsequent speech frame, and the method 700 continues using the subsequent speech frame. However, if it is determined in the decision block 745 that an end of the speech signal has not been found, then it is further determined if the energy exceeds a predetermined threshold in a decision block 750. If it is determined that the energy does not exceed the predetermined threshold in the decision block 750, then the method 700 then returns to the block 705 to input an energy from a subsequent speech frame, and the method 700 continues using the subsequent speech frame. Alternatively, if it is determined that the energy does in fact the predetermined threshold in the decision block 750, then an end of the speech signal is deemed to have been found, and a variable "end found" is set to a value of "1" in the embodiment shown within the method 700 of the FIG. 7 as shown in the block 773. Subsequently, in a decision block 775, it is further determined if a duration exceeds a predetermined threshold. If it is determined that the duration does in fact exceed the predetermined threshold in the decision block 775, then an end and a beginning of the speech signal are deemed not to have been found after all, and the variables "beginning found" and "end found" are set to a value of "0" in the embodiment shown within the method 700 of the FIG. 7 as shown in the block 780. Subsequently, the method 700 then returns to the block 705 to input an energy from a subsequent speech frame, and the method 700 continues using the subsequent speech frame. Similarly, if it is determined that the duration does not exceed the predetermined threshold in the decision block 775, then the method 700 then returns to the block 705 to input an energy from a subsequent speech frame, and the method 700 continues using the subsequent speech frame.

From another perspective, the method 700 of FIG. 7 illustrates an efficient way to determine the approximate beginning and end-points of the speech portion of an utterance in the recorded signal. Unlike traditional and conventional energy-based end-point detection methods, the method 700 operates in real-time providing extremely fast end-point detection within the utterance. Although the method 700 is proposed in the context of a speaker dependent recognition task, the method 700 is easily extended to other automatic speech recognition applications. Finally, those having skill in the art of speech recognition and speech recognition training will recognize that the method 700 illustrates one implementation of an endpoint detection method; several variations of the implementation of the method 700 are possible.

A slightly simplified flow of the end-point detection process is shown by the method 700 of FIG. 7. As discussed above, the decision of beginning or end-point is made on a frame-by-frame basis. In addition, the decision is based on the energy values computed in the feature-extraction step. Since no prior information on the quality of speech, background noise or the speaker's style is available, the energy thresholds used in the decision making process are computed from a few frames of background noise/silence. Hence the first few frames (e.g. 5 as shown in the decision block 725 of the embodiment of FIG. 7) of the recorded signal are assumed to be background noise/silence. A predetermined threshold will verify the condition. If this condition fails, that utterance is declared to be unfit for training or recognition. However, if the condition is satisfied, the proper energy threshold is computed from the first few frames (e.g. 5 or 6) of the signal. After computing the threshold, the energy value for each frame is checked against the threshold. If the energy value exceeds the threshold for a predetermined number of consecutive frames, the speech is declared to have started within the utterance.

Once the beginning point determination is made, the energy value for each frame is checked against the threshold. If the energy value falls below the threshold for a predetermined number of consecutive frames, the end of utterance is declared to have occurred at which time the recording process is terminated successfully. The termination of recording is followed either by estimation of the model element if it is in the training phase or by the termination of recognition process if it is in recognition phase. The integrated speaker dependent speech training and speaker dependent recognition system 200 of FIG. 2 illustrates one such embodiment of the invention in which the method 700 of FIG. 7 is performed wherein the speaker dependent speech recognition training circuitry 240 or the automatic speaker dependent speech recognition circuitry 260 is operated at various times depending on whether speech recognition training or speech recognition is to be performed.

Even though the method 700 of FIG. 7 uses predetermined thresholds, the thresholds are adaptable to suit the particular environment, e.g., to accommodate changes in background noise.

Some additional information such as word/utterance duration thresholds, in-between word gaps are used to avoid mislabeling clicks and pops as valid speech segments. In addition, this method 700 is easily extendable to include additional information such as average zero-crossing in each frame to refine the beginning and end-points of the utterance. After the beginning and end-points are determined, a few background/silence frames at either end of the utterance are also included in the speech recognition training as well speech recognition functions to ensure good background modeling and robustness.

Figure 8:
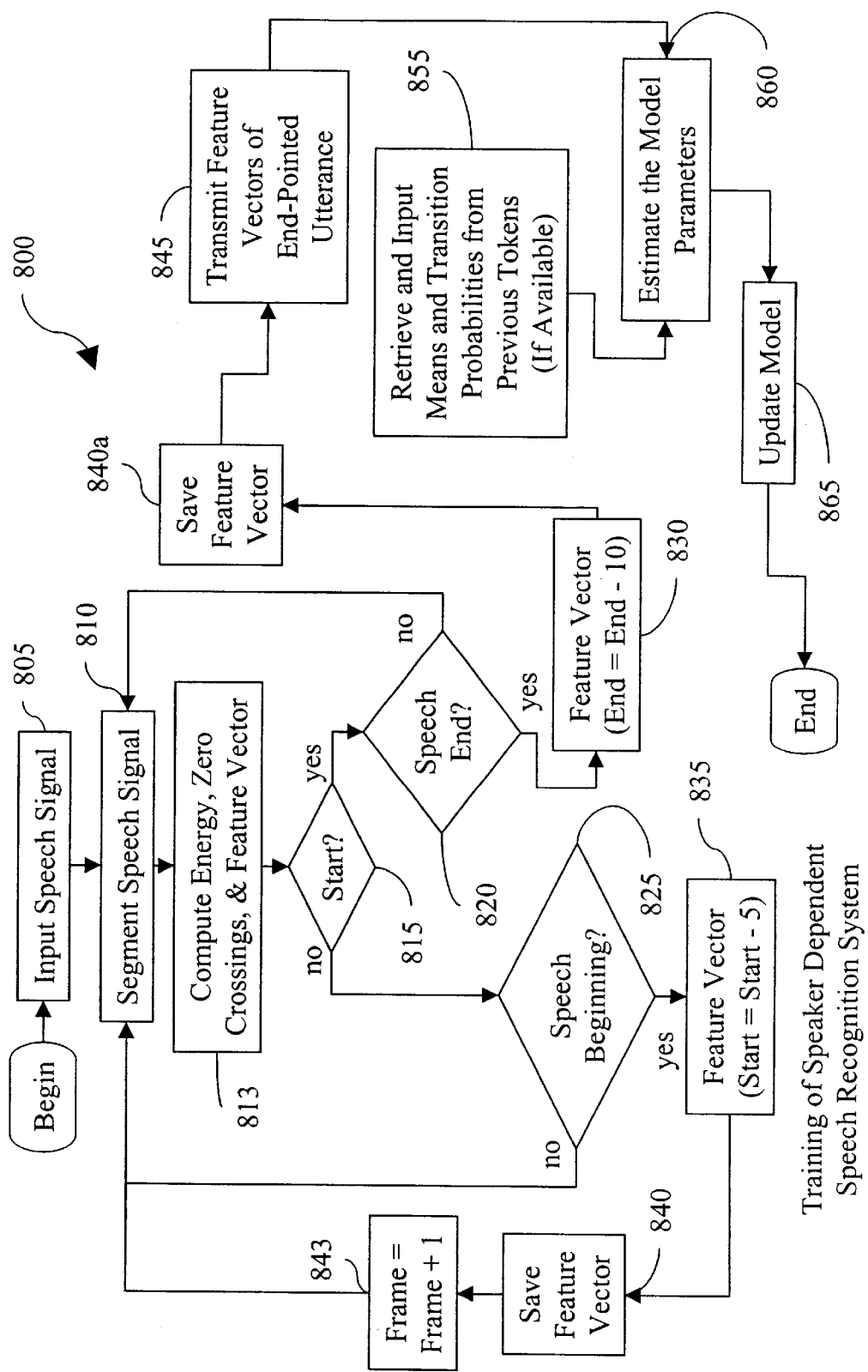
FIG. 8 is a functional block diagram illustrating a method performed in accordance with the invention that performs training of a speaker dependent speech recognition system in accordance with the invention.

FIG. 8 is a functional block diagram illustrating a method 800 performed in accordance with the invention that performs training of a speaker dependent speech recognition system in accordance with the invention. In a block 805, a speech signal is input into a speech signal processor. In a block 810, the speech signal is segmented into a predetermined number of frames and one frame of the segmented speech signal is transmitted within the speech processor in which the method 800 is performed. In a block 813, an energy, a number of zero crossings, and a feature vector are all calculated for a given frame of the speech signal. In a decision block 815, it is determined whether a start of a word within the speech signal has been found. If the start of a word within the speech signal has indeed been found in the decision block 815, then in a decision block 820, it is further determined if an end of the speech signal has been found.

Alternatively, if the start of a word within the speech signal has not been found in the decision block 815, then in a decision block 825, it is further determined if a beginning of the speech signal is found. If the beginning of the speech signal is not found in the decision block 825, then the method 800 returns to the block 810 and again segments the speech signal using at least one additional frame of the speech signal. Similarly, if the end of the speech signal is not found in the decision block 820, then the method 800 returns to the block 810 and again segments the speech signal using at least one additional segment of the speech signal. However, if the beginning of the speech signal is in fact found in the decision block 825, then the method 800 decrements a start frame of the speech signal. In this particular embodiment of the invention, the start frame of the speech signal is decremented by five. If the end of the speech signal is in fact found in the decision block 820, then the method 800 decrements the frame of the speech signal. In this particular embodiment of the invention, the frame is decremented by ten.

If either the end of the speech signal or the beginning of the speech signal is found in either of the decision blocks 820 and 825, the feature vector corresponding to the speech signal is saved in a memory location within a block 840 or a block 840*a*, after having passed through the blocks 830 and 835, respectively. The block 840 is used to save the feature vector if the speech beginning was found in the block 820. Then, in a block 843, the frame corresponding to the speech signal is incremented by one. Subsequently, the method 800 returns to the block 810 and again segments the speech signal using at least one additional frame of the speech signal.

Alternatively, the block 840*a* is used to save the feature vector if the speech end was indeed found in the block 820. Subsequently, in a block 845, the feature vectors corresponding to the speech signal utterance whose end-points have been properly identified are transmitted to a processing circuitry for estimation of the model parameters within a block 860. If available, means and transition probabilities from previous tokens can be retrieved and input to the processing circuitry for the estimation, as illustrated by a block 855. Finally, in a block 865, a model that estimates the parameters of the speech signal is updated; the model is subsequently used to perform speech recognition in accordance with the invention.

The method 800 provides for estimation of the parameters of the simplified model using either one token or multiple tokens of a vocabulary word to perform speech recognition. During the training phase, each word that the user would like to introduce into the vocabulary set is spoken by the user once, twice or three times. The training process is an estimation of model parameters for the vocabulary word using the training tokens. Based on the number of training tokens available at a time, the training process can be either single-token training or multiple-token training without departing from the scope and spirit of the invention. In the single-token training, the model parameters are estimated from a single utterance of the vocabulary word. In multiple-token training, the same elements are estimated from two or more tokens. In certain embodiments of the invention, the two or more tokens correspond to multiple utterances of the same vocabulary word. For example, the multi-stage training process on the other hand, updates the model parameters using a new utterance of the vocabulary word for which a model already exists.

The training procedure for a single token as implemented in the current system is depicted in the functional block diagram of FIG. 8 illustrating the method 800. A feature vector $\vec{O}_t$ is computed for each frame of speech as shown in the block 813. After feature vectors in all the frames in the end-pointed utterance are collected, the mean vectors and transition probabilities are computed as shown in the block 860.

In certain embodiments of the invention, since only one token is available in the single-token training embodiments, a reasonably good estimate is obtained by uniformly segmenting the sequence of feature vectors and approximating each segment as one state in the hidden Markov model (HMM) as shown in FIG., 4 for a hidden Markov model (HMM) with five uniform states.

Subsequently, the means and transition probabilities are estimated as $$\mu_j^i = \frac{1}{S_j} \sum_{t=1}^{S_j} O_{t+S_{j-1}}^i$$

for i=1,2, . . . K and j=1,2, . . . N $a_{jj} = 1/S_j$ and $a_{ij} = 1 - a_{jj}$ where $S_j$ is the number of feature vectors in state j.

Based on the performance of the system, these estimates seem to model the utterance sufficiently. However, in case of poor estimates, the best state sequence/alignment is computed by using the Viterbi alignment procedure that finds the optimum distribution of feature vectors among the states. Then the above set of equations is used to re-compute $a_{ij}$ and $\mu_j$s. This process can be repeated until a predetermined error criterion (criteria) is (are) satisfied.

In the case of multi-stage training, the new training token is uniformly or non-uniformly segmented as described above in FIG. 3. The parameters are updated by the following equations.

$$\hat{\mu}_j^i = \frac{1}{(S_j^1 + S_j^2)} \left[ \mu_j^i * S_j^1 + \sum_{t=1}^{S_j^2} O_{t+S_{j-1}^2}^i \right]$$

and $$\hat{a}_{jj} = \frac{2}{(S_j^1 + S_j^2)}$$

for $i = 1, 2, \ldots K$ and $j = 1, 2, \ldots N$ $\hat{a}_{ij} = (1 - a_{jj})$ where $\hat{\mu}_j^i$ is the new mean of $i^{th}$ element in $j^{th}$ state, $\mu_j^i$ is the mean of $i^{th}$ element in $j^{th}$ state estimated from first training token, $\hat{a}_{ij}$ is the new transition probability of going from state i to state j.

$S_j^1$ is the number of frames in state j of first training token and $S_j^2$ is the number of frames in state j of the new training token.

$\vec{o}$ for t=1, 2, . . . T are the feature vectors of new training token.

Once the model parameters are estimated, the training is complete for that particular word. The same process is applied to every word in the vocabulary set to obtain all the word models.

Since the training is simple and is based on uniform segmentation and is performed only in one iteration, it is crucial that the part of the utterance used to estimate the model parameters consists of only the speech portion corresponding to the vocabulary word. The silence portion of the utterance would negatively influence the estimation of the model parameters. This calls for a reliable method for detection of end-points of the speech in the spoken utterance. Such an end point detection method is described in FIG. 7. However, as described above in various embodiments of the invention, non-uniform segmentation of the speech signal is performed in alternative embodiments of the invention. For example, if desired, the non-uniform segmentation of the speech signal is performed in response to at least one element of the feature vector corresponding to the speech signal.

Although the endpoint detection method is presented in the context of training an automatic speech processor, endpoint detection is a crucial step even in the speech recognition phase in an isolated-word speech recognition system.

Figure 9:
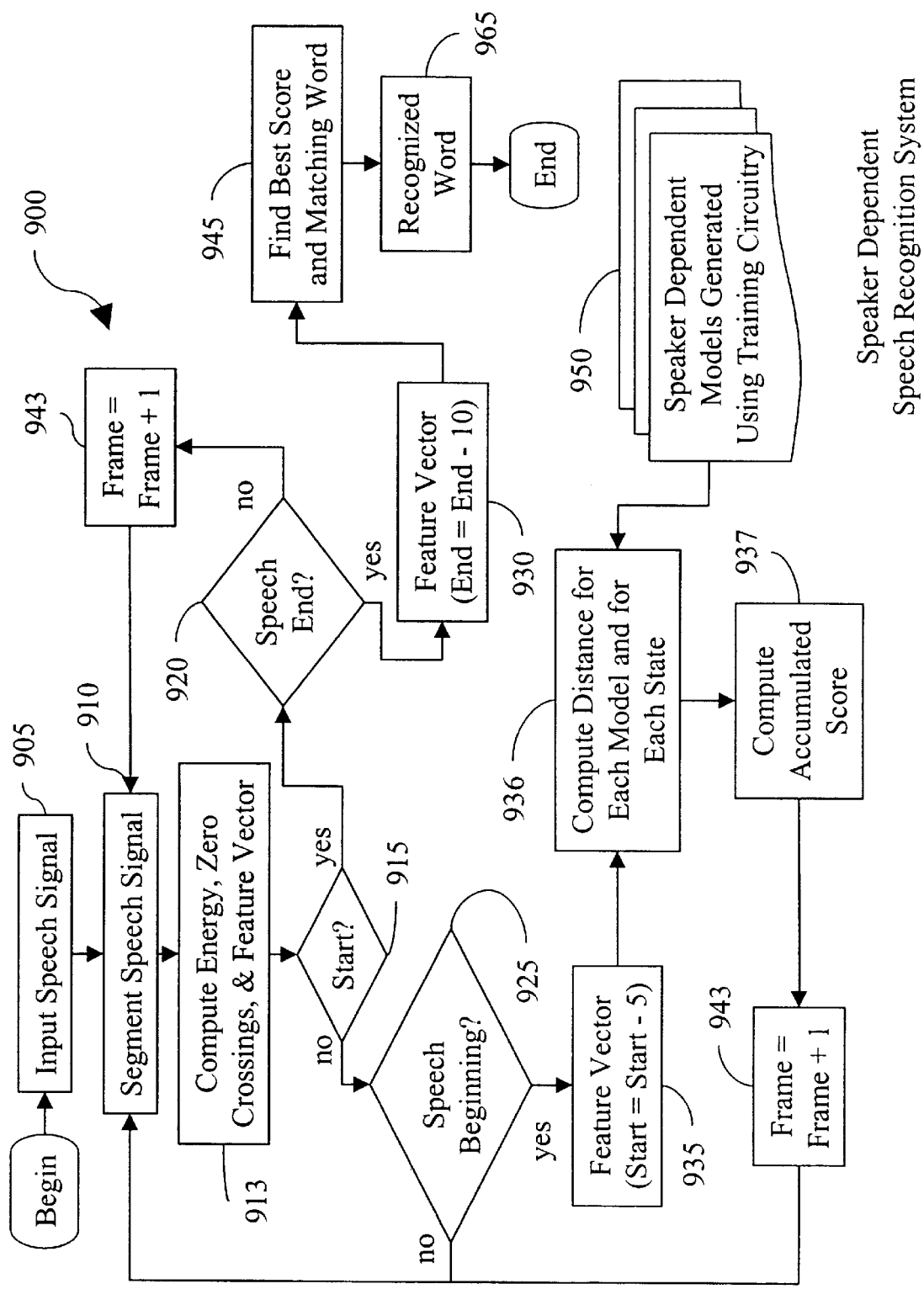
FIG. 9 is a functional block diagram illustrating a method performed in accordance with the invention that performs speaker dependent speech recognition within a speech signal and performs speaker dependent speech recognition in accordance with the invention.

FIG. 9 is a functional block diagram illustrating a method 900 performed in accordance with the invention that performs speaker dependent speech recognition within a speech signal and performs speech recognition in accordance with the invention. In a block 905, a speech signal is input into a speech signal processor. In a block 910, the speech signal is segmented into a predetermined number of frames and one frame of the segmented speech signal is transmitted within the speech processor in which the method 900 is performed. In a block 913, an energy, a number of zero crossings, and a feature vector are all calculated for a given frame of the speech signal. In a decision block 915, it is determined whether a start of a word within the speech signal has been found. If the start of a word within the speech signal has indeed been found in the decision block 915, then in a decision block 920, it is further determined if an end of the speech signal has been found.

Alternatively, the start of a word within the speech signal has not been found in the decision block 915, then in a decision block 925, it is further determined if a beginning of the speech signal is found. If the beginning of the speech signal is not found in the decision block 925, then the method 900 returns to the block 910 and again segments the speech signal using at least one additional frame of the speech signal. Similarly, if the end of the speech signal is not found in the decision block 920, the frame is incremented by one in a block 943, and then the method 900 returns to the block 910 and again segments the speech signal using at least one additional frame of the speech signal. However, if the beginning of the speech signal is in fact found in the decision block 925, then the method 900 decrements a start element of the feature vector of the speech signal. In this particular embodiment of the invention, the start element of the feature vector of the speech signal is decremented by five. If the end of the speech signal is in fact found in the decision block 920, then the method 900 decrements an element of the feature vector of the speech signal. In this particular embodiment of the invention, the end element of the feature vector of the speech signal is decremented by ten.

If the beginning of the speech signal is found in the block 925, then after having passed through the block 935, a distance is computed for each model and for each state of the speech signal in a block 936. Subsequently, in a block 937, the score is accumulated, and in a block 943, the frame corresponding to the speech signal is incremented by one. Subsequently, the method 900 returns to the block 910 and again segments the speech signal using at least one additional frame of the speech signal. In performing computation of the distance for each model and for each state of the speech signal in the block 936, a plurality of speaker dependent models 950 that are generated using any speaker dependent speech recognition training performed in accordance with the invention is used in certain embodiments of the invention.

Alternatively, if an end of the speech signal is found in the block 920, and after having passed through the block 930, a best score and a matching word are found in a block 945. Subsequently, after the best score and the matching word are found in the block 945, a recognized word is identified in the block 965. At this point, speaker dependent speech recognition has been performed in accordance with the method 900.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A speech processing system that determines an endpoint and a beginning point within a speech utterance having a plurality of frames, the speech recognition training system comprising:

an element selection circuitry that selects a plurality of elements from a feature vector using at least one criterion, the feature vector is generated using a speech signal;

a speech segmentation circuitry that uses the selected plurality of elements from the feature vector to perform clustering of the plurality of frames to segment the speech utterance; and a state determination circuitry that determines a number of states of the speech signal, the number of states of the speech signal corresponds to the number of segments into which the speech signal is segmented.

2. The speech processing system of claim 1, wherein the speech processing system performs at least one of speech recognition training and speech recognition.

3. The speech processing system of claim 1, wherein the selected plurality of elements from the feature vector is determined using clustering a correlation matrix.

4. The speech processing system of claim 1, wherein the criterion that is used to select the plurality of elements from the feature vector is a number of frames of the speech utterance.

5. The speech processing system of claim 1, wherein a single iteration of Viterbi alignment is used to segment the speech utterance.

6. The speech processing system of claim 1, wherein the selected plurality of elements from the feature vector is determined using clustering.

7. The speech processing system of claim 1, wherein the segmentation of the speech utterance is uniform.

8. The speech processing system of claim 1, wherein the segmentation of the speech utterance is non-uniform.

9. A speech recognition training system that generates a model used to perform speech recognition on a speech signal, the speech recognition training system comprising:

a model parameter estimation circuitry that receives a plurality of elements from a feature vector, the feature vector is generated using the speech signal;

a speech segmentation circuitry that uses the plurality of elements from the feature vector to segment the speech signal; and a state determination circuitry that determines a number of states of the speech signal, the number of states of the speech signal corresponds, at least in part, to the number of segments into which the speech signal is segmented.

10. The speech recognition training system of claim 9, wherein a single iteration of Viterbi alignment is used to segment the speech signal.

11. The speech recognition training system of claim 9, wherein a plurality of iterations of Viterbi alignment is used to segment the speech signal.

12. The speech recognition training system of claim 9, wherein the received plurality of elements from the feature vector is determined using clustering.

13. The speech recognition training system of claim 9, wherein the segmentation of the speech signal is uniform.

14. The speech recognition training system of claim 9, wherein the segmentation of the speech signal is non-uniform.

15. The speech recognition training system of claim 9, wherein the speech recognition training system performs end-point detection of a speech utterance of the speech signal.

16. A method that generates a model used to perform speech recognition on a speech signal, the method comprising:

selecting a plurality of elements from a feature vector, the feature vector is generated using the speech signal;

segmenting the speech signal using the plurality of elements from the feature vector; and determining a number of states of the speech signal, the number of states of the speech signal corresponds to the number of segments into which the speech signal is segmented.

17. The method of claim 16, wherein a single iteration of Viterbi alignment is used to segment the speech signal.

18. The method of claim 16, wherein the selected plurality of elements from the feature vector is determined using clustering.

19. The method of claim 16, wherein the segmentation of the speech signal is uniform.

20. The method of claim 16, wherein the segmentation of the speech signal is non-uniform.

* * * * *